Nov. 4, 1958  E. J. DIEBOLD  2,859,389
PROTECTION FOR SERIES CAPACITOR
Filed Aug. 31, 1953  2 Sheets-Sheet 1
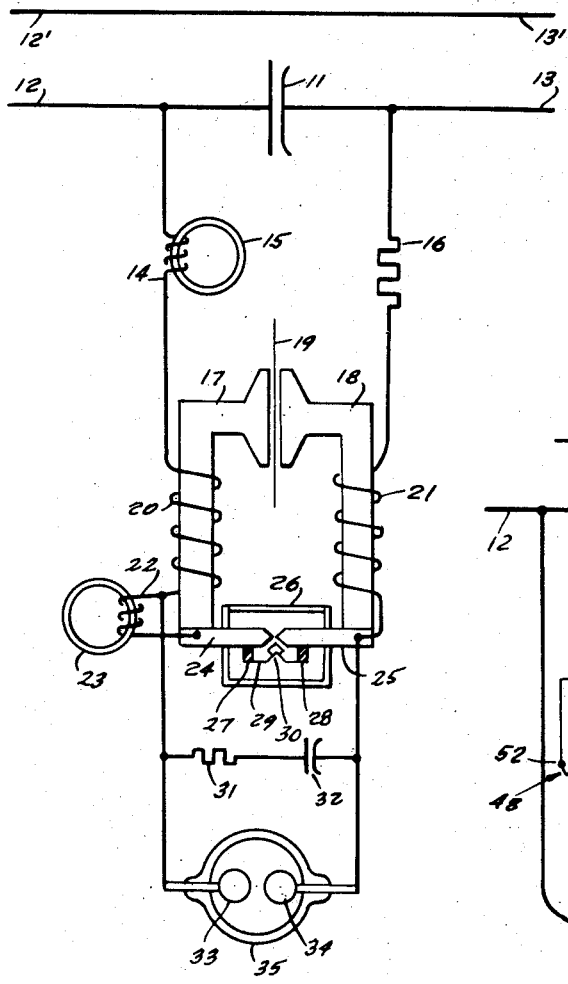
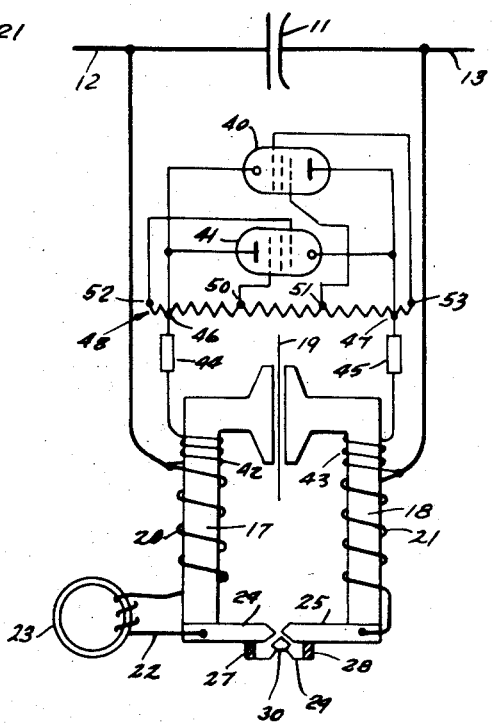
INVENTOR,
EDWARD JOHN DIEBOLD
BY
ATTORNEYS

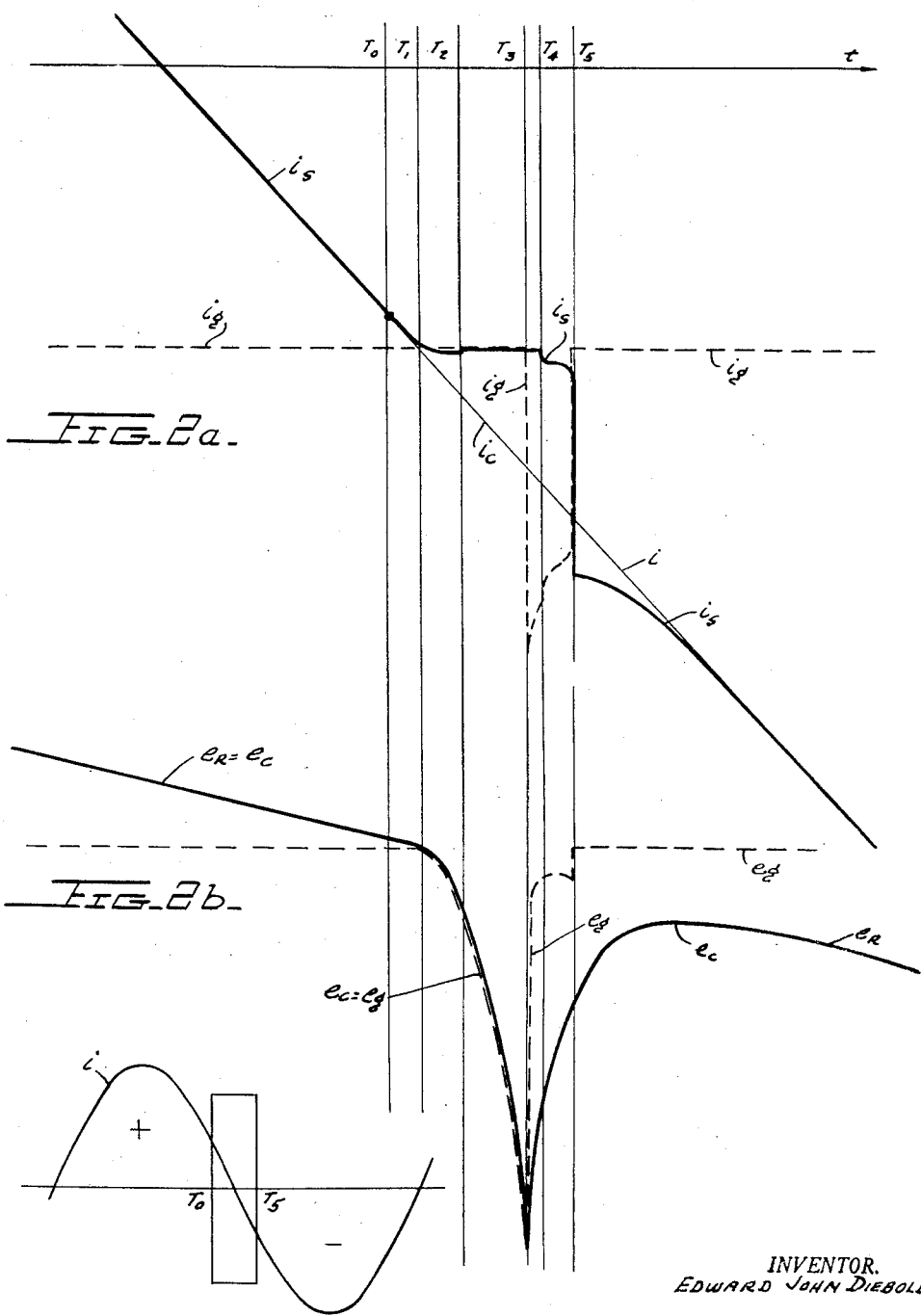

United States Patent Office 2,859,389
Patented Nov. 4, 1958

2,859,389

PROTECTION FOR SERIES CAPACITOR

Edward John Diebold, Ardmore, Pa., assignor to I-T-E Circuit Breaker Company, Philadelphia, Pa.

Application August 31, 1953, Serial No. 377,409

1 Claim. (Cl. 317—12)

My present invention relates to an automatic by-pass for series capacitors and is related to my copending applications Ser. No. 144,571, filed February 16, 1950, now Patent No. 2,664,525 and Serial No. 192,190, filed October 19, 1952, now Patent No. 2,664,526.

More particularly my invention relates to a novel by-pass circuit shunting series capacitor which is arranged to close when the current in the main line approaches fault current values.

A capacitor which is connected directly in series with the main electrical line is referred to as a series capacitor and it serves to compensate for the voltage drop caused by the line inductance.

The voltage appearing across the series capacitor will be proportional to the current flowing therethrough and the capacitor must be constructed to maintain the maximum voltage created thereby. However, in the event the voltage should rise above this predetermined maximum value, the capacitor will be destroyed.

My instant invention is directed to a novel automatic by-pass circuit for the series capacitor in order to protect this component in the event the voltage should rise above a predetermined value.

For a given capacitor, the volume and price will increase with the square of the maximum current which the capacitor is required to carry. Thus, it is uneconomical to build a capacitor for the maximum fault current which may flow through the power line. An economical solution to the problem is to construct the capacitor so that it will withstand a predetermined maximum value which will never be attained during the normal operation of the circuit. In the event that the voltage should exceed the predetermined maximum value, it will be interrupted by a circuit breaker after a short period of time. However, during the time required to open the circuit breaker, an automatic by-pass circuit will shunt the current around the series capacitor.

My invention is directed to a novel by-pass circuit arrangement which closes within the meter of a few micro seconds whenever the voltage on the series capacitor rises above a danger limit, e. g., predetermined maximum value, and which opens whenever the voltage drops below the predetermined maximum value.

In my novel automatic by-pass circuit, I provide an electromagnetic switch which is enclosed in a housing filled with nitrogen under high pressure.

A glass enclosure arc gap is shunted across the electromagnetic switch. On the occurrence of a voltage above the predetermined maximum value, the air gap will break down almost instantaneously. This will permit the energization of the control circuit for the electromagnetic switch which will subsequently close a few micro seconds later.

When the current in the main line goes to zero within the half cycle, the substantially massless armature of the electromagnetic switch will be returned to neutral or disengaged position. Since the glass enclosed arc gap will be deionized at this time, the by-pass circuit for the armature will be removed.

In addition to the circuitry above described, I provide saturable reactors to protect the cooperating contacts of the electromagnetic switch so that it can open and close under substantially currentless conditions.

Accordingly, a primary object of my invention is to provide an automatic by-pass circuit for series capacitors which is substantially instantaneous in operation and which is fully automatic.

Still another object of my invention is to provide protective circuit means for series capacitors which utilizes an electromagnetic switch protected by saturable reactors.

Another object of my invention is to provide automatic series protector circuit which automatically opens and closes without requiring resetting following a protective step.

Still another object of my invention is to provide circuitry for the protection of a series capacitor which is completely self-containing and requires no outside power supply.

A still further object of my invention is to provide a protective device for a series capacitor which may be completely sealed off and immersed in oil.

Another object of my invention is to provide an automatic by-pass circuit for a series capacitor in which no high gases are generated.

A still further object of my invention is to provide protective means for a series capacitor which is independent of atmospheric conditions or temperature.

In a second embodiment of my invention, I provide a series capacitor which utilizes cold cathode tubes energized from an auto-transformer. In this arrangement, the glass enclosed arc gap is replaced by two cold cathode tubes which are, respectively, energized by positive and negative half cycles of the current.

In the second embodiment of my invention when the voltage across the series capacitor rises to an unduly high value, e. g., above a predetermined maximum value, one of the cold cathode tubes will flash over depending upon the polarity of the voltage.

The auto-transformer is connected to the grids and provides an adjustment for the grid potential of the tubes in order to adjust the trip or firing voltage to the desired value. When either one of the cold cathode tubes fires, current will flow through an auxiliary circuit and the electromagnetic switch will be energized thereby causing the substantially massless armature to short circuit the series capacitor. In this arrangement, a saturable reactor may be used in coordination with the electromagnetic switch to protect the cooperating contacts thereof. Since the substantially massless armature of the electromagnetic switch serves as the main protection for the series capacitor, the reduction of the current in the main line to zero will cause complete interruption of the circuit. That is, the by-pass circuit will be effective for only one half of the conducting cycle.

In the event that the fault should continue or the circuit breaker should not open within this period of time, the closing operation of the automatic by-pass circuit will repeat itself so that the series capacitor may be protected on the subsequent half cycle. That is, the protection cycle for both the first and second embodiment of my invention will have a duration of approximately one half cycle or shorter and will be independent of the conditions which have previously existed. Thus, the by-pass circuit will be able to function for any unsuspected surge voltage traveling wave or short circuit and will cease to operate instantly whenever the fault condition subsides.

Accordingly, a further object of my invention is to provide an automatic by-pass circuit for a series capacitor in which two cold cathode tubes are used which are alternately fired depending upon the polarity of the voltage in the main circuit.

A still further object of my invention is to provide a protective circuit for a capacitor which utilizes an autotransformer to trigger off the cold cathode tubes on the occurrence of an excessive voltage across the terminals of the capacitor.

These and other objects of my invention will be apparent from the following description when taken in connection with the drawings in which:

Figure 1 is a schematic electrical diagram of the first embodiment of my invention. This figure illustrates an automatic by-pass circuit for a series protector having a glass enclosed arc gap and electromagnetic switch connected in parallel with each other and across the terminals of a series capacitor.

Figure 2a is a time-current curve showing the current conditions through the automatic by-pass circuit in the event the voltage across the capacitor exceeds a predetermined value.

Figure 2b is a voltage-time curve illustrating the voltage conditions which exist in the automatic by-pass circuit in the event that the voltage across the series capacitor exceeds a predetermined value.

Figure 2c illustrates the full cycle of current existing in the main circuit protected by the series capacitor. The portion of the current time curve indicated by the rectangle is that period of time which is illustrated in Figures 2a and 2b.

Figure 3 illustrates a second embodiment of my invention wherein the electromagnetic switch in the automatic by-pass circuit is operated in coordination with cold cathode tubes which are respectively poled for negative and positive cycles of current.

Referring now to Figure 1, the capacitor 11 is connected in series with the line 12—13 which may be one electrical line of the power system 12—13 and 12'—13'. That is, the series capacitor 11 is utilized in the line 12—13 and 12'—13' to create the power factor thereof, the ends of the line 12—12' representing the incoming or source side of the line and the end 13—13' representing the outgoing or load side of the line.

The saturable magnetic core 15 is provided with a main coil 14. The magnetic core 15 is preferably wound of thin gauge magnetic tape. A resistor 16 is connected in series with the by-pass circuit and serves to limit the discharge current at the capacitor 11. The magnetic cores 17 and 18 are made of laminated soft magnetic material with a sheet of insulation 19 positioned therebetween to insulate the core 17 from the core 18. Main energizing coils 20 and 21 are wound on the magnetic core 17 and 18. A second saturable reactor magnetic core 23 is provided with a main coil 22 wound thereon. The saturable core 23 is preferably made of a wire thin gauge magnetic tape in substantially the same manner as the magnetic core 15.

An electromagnetic switch is housed within the housing 26 which is preferably made of an insulating material such as ceramic and sealed gas tight. This housing preferably contains nitrogen under high pressure to protect the cooperating contacts therein which will hereinafter be described.

Magnetic pole pieces 24 and 25, magnetically linked to the pole members 17 and 18, extend through the housing 16 and form the stationary contacts of the electromagnetic switch. Thus, these magnetic poles 24 and 25 are electrical conductors and are preferably made of laminated soft magnetic material and silver sheets.

The electromagnetic switch is provided with stand-off insulators 27 and 28 which serve as a mounting and support for the blade biasing spring 29. A substantially massless armature 30 is mounted on the blade spring 29 and is biased to disengaged position with respect to the conductor-magnetic poles 24—25. The substantially massless armature 30 is preferably made of a soft iron and coated with silver so that it can serve the dual function of being an integral part of the magnetic system as well as the moving contact of the switch.

Armature 30 is preferably substantially massless so that it has rapid operation from disengaged position to engaged position in approximately 0.0001 second. The silver coating on the armature 30 may have a sufficient cross-sectional area to carry over 100 amperes.

A resistor 31 and capacitor 22 are connected in series and connected to the end terminals, respectively, of the main coils 20 and 21.

An arc gap opening is connected in parallel with the resistor 31 and the capacitor 32. The arc gap opening is enclosed in a glass housing 35 which is filled with nitrogen under low pressure. The electrodes 33—34 of the arc gap are enclosed within the housing 35.

During the normal operation of the main power line 12—13 and 12'—13' no current will flow through the automatic by-pass circuit as there is insufficient voltage to break down the arc gap between electrodes 33—34 and also due to the disengaged position of the armature 30 with respect to its stationary contacts 24 and 25.

That is, below the danger level of the voltage on the capacitor 11, the automatic bypass circuit is insulated by the nitrogen in the housing 26 between the stationary contacts or poles 24—25 and the substantially massless armature 30, as well as in the gap between the electrodes 33—34. The pressure of the nitrogen in the housing 26 of the electromagnetic switch is much higher than the nitrogen in the glass enclosure 36 for the electrodes 33—34. Thus, the break-down or spark over voltage between the poles or stationary contacts 24 and 25 is much higher than between the electrodes 33 and 34.

It will be noted that a very small magnitude of charging current will flow through the series combination of the resistor 31 and the capacitor 32. However, the magnitudes of the resistor 31 and the capacitor 32 are so designed that the magnitude of leakage current flowing therethrough is negligible when compared with the current flowing through the series capacitor 11.

On the occurrence of an exceptionally high line current wherein the voltage across the series capacitor 11 exceeds a predetermined maximum value fault for which this component is designed, the automatic by pass circuit will operate as follows: When the voltage across the series capacitor 11 reaches a dangerous level, the low pressure nitrogen in the glass housing 35 will permit an arc to be formed in the gap between the electrodes 33 and 34. The arc created between these electrodes will appear instantaneously and thus, the series capacitor 11 will be immediately short circuited through the path comprising the main coil 14 and the saturable reactor 15, the main winding 20 of the magnetic pole 17 from the electrode 33 through the nitrogen in the housing 35 to the electrode 34, the second main winding 21 of the magnetic member 18, through the resistor 16 back to the main line 13.

The current through the main coils 20 and 21 will therefore be the sum of the line current and the discharging current of the series capacitor 11. This current flowing through the main coils 20 and 21 will magnetize the magnetic cores 17 and 18 which will in turn magnetize or energize the poles 24 and 25 of the electromagnetic switch. The magnetized poles 24 and 25 will thereby attract a substantially massless armature 30 against biasing leaf spring 29. That is, the armature 30 will now be moved to engaged position with respect to the stationary contacts 24 and 25.

From the time of the instantaneous break down of the gap between electrodes 33 and 34 until the movement of the armature 30 to engaged position with respect to pole pieces 24 and 25, there will be a time lapse of 0.001 second, the gap 33—34 will not be short circuited due to the engagement of the movable contact 30 with respect to the stationary contact 24—25. Hence, the arc current will now flow through the main coil 22 of the saturable reactor 23, pole pieces 24, the armature 30 and the pole piece 25. That is, the closing of the armature 30 will provide a bypass circuit around the electrodes 33 and 34. However, a small delay in the rise of the current through the electromagnetic switch is added due to the initial unsaturated condition of the saturable reactor 23. Thus, the core 23 must first be saturated before the current can rise to its full value. This small delay which is approximately 0.001 second will permit the armature 30 to seat itself rapidly against the spark pole members 24 and 25 without being welded by the inrush current. That is, the movement of the armature 30 from the disengaged position to the engaged position will occur under substantially currentless conditions.

When the current through the armature 30 reaches a full value, the arc between the electrodes 33 and 34 will be completely extinguished. An arc within the housing 35 will thereby have existed for approximately 0.002 second and will not have existed for a sufficient length of time to do any damage to the arc gap. From this period on, until the alternating current in the main line 12—13 passes through zero, the compound magnet comprising the members 17—18—24—28 will hold and maintain the armature 30 in engaged position and thereby provide a bypass circuit for the series capacitor 11.

When the alternating current in the main line 12—13 passes through zero, as it will do at the end of each half cycle, the magnetic field through the pole pieces 24 and 25 to the armature 30 will become too small to hold the armature 30 against on opening biasing force of the spring 29. Then the armature 30 will be released from the magnetic pole and will thus be moved to its disengaged position by means of the leaf spring 29. The period of time for this operation will be between 0.001 to 0.002 second.

The saturable reactor 15 with its main coil 14 will maintain the current in the electromagnetic switch bypass circuit at a very low value during the opening time of the armature 30. When the saturable reactor 15 is fully saturated, the current through its main winding 14 is free to rise again but at this time the armature 30 will be in the disengaged position since the arc gap between the electrodes 34 and 35 is deionized following the extinction due to the closing of the armature 30 and thus the bypass circuit is completely opened as it was before its operation to protect the series capacitor 11. As soon as the current flowing in the bypass circuit ceases to flow, the voltage on the capacitor 11 will again rise.

In the event that the current flowing in the main line 12—13 is above normal so that the voltage across the series capacitor 11 exceeds a predetermined maximum value, the arc gap 34—35 will again break down and the bypass circuit will operate as heretofore described in connection with the first half cycle. Thus, it will be noted that the operation of the by-pass circuit is repeated for each half cycle and its operation is completely independent of the conditions which happen immediately prior or which may happen immediately following. Thus, in any half cycle when the voltage across the series capacitor 11 rises above a dangerous value of a predetermined maximum value, the automatic bypass circuit will immediately close within the half cycle of operation. Following the completion of this half cycle in which the fault existed, the bypass circuit will open again to thereby free the capacitor for normal operation.

It will be noted that with my novel bypass circuit arrangement, it is not necessary to reset the device following its protection of the capacitor from fault current since the line current will drop back to its rated value or below and the voltage across the arc gap 33—34 can not rise to its spark or break down value. Thus, due to the above, the operation of the by-pass circuit will become impossible in the event that the fault condition does not exist on the half cycle following its initial operation.

In Figure 2a and 2b, I have shown, respectively, current time and voltage time curves of electrical conditions existing within the bypass circuit during a fault condition. The curves 2a and 2b are drawn with a common time axis and the time considered therein is of the magnitude of about one milli second before and a few milli seconds after the zero current point within a cycle.

The period of time which is illustrated in Figures 2a and 2b between times $T_0$—$T_5$ is illustrated in Figure 2c by the rectangle which is drawn near the end of the positive half cycle and the beginning of the negative half cycle of the main current $i$ of the circuit.

The current $i$ in the Figures 2a and 2c illustrates the current flowing through the main line from the point 12 to the point 13. Before the time $T_0$, the armature 30 is closed and all of the current $i$ will flow through the electromagnetic switch (30). The current flowing through the electromagnetic switch is indicated by $i_s$.

At the time $T_0$, the main current $i$ has reduced to a sufficiently low value so that the magnetic poles 17—18 and 24—25 is sufficiently reduced to release armature 30 to the control of the biasing spring 29. Thus, the armature 30 will move to disengaged position at some time between the interval $T_1$ to $T_2$.

The current $i_s$ in the electromagnetic switch (30) is maintained at a low value due to the coil 14 of the saturable reactor 15. That is, the core 15 will be unsaturated and hence, a high impedance will exist across the terminals of its main winding 14 to thereby limit the current through the electromagnetic switch so that the armature 30 will be disengaged under substantially currentless conditions.

After the time $T_2$, the electromagnetic switch (30) is opened or disengaged and the bypass circuit is out of action, line current $i$ will now flow through the capacitor. The current in the series capacitor 11 is indicated by $i_c$. The voltage conditions existing in the bypass circuit during the period of time from $T_0$ to $T_s$ is indicated in Figure 2b.

At the time $T_1$, the current $i$ flows through series capacitor 11 due to the fact that the saturable reactor 15 is unsaturated and hence, the high impedance across its main coil 14 will block current flow through the bypass circuit. Thus, the voltage $e_c$ across the series capacitor 11 rises sharply in order to absorb the full line current $i$.

It will be noted that the voltage which appears across the series capacitor 11 during this period of time will also appear across the arc gap 33—34 so that voltage $e_c$ will be equal to voltage $e_g$ wherein $e_g$ indicates the voltage across the electrodes 33—34. At the time $T_3$, the gap 33—34 will break down and a current through the gap $i_g$ (indicated by the dotted line in Figure 2a) rises to a high value due to the discharge of the series capacitor 11. Hence, the series capacitor voltage $e_c$ will drop down sharply and finally assume the value of $e_c$ to $e_r$ which will be proportional to the current $i$.

The spark gap voltage $e_g$ is shown dotted in Figure 2b. The spark gap voltage $e_g$ breaks down to the arc voltage at the time $T_3$ and will completely collapse at the time $T_4$ when the arc is short circuited through the electrodes 33—34.

The current $i_g$ through the arc gap 33—34 is high during the short period of time from $T_3$ to $T_5$ and after this period of time is again at zero magnitude. At the time $T_4$, the electromagnetic switch (30) may again be moved to engaged position and the current rise will be limited to a low value due to the high impedance of the coil 24 on the saturable reactor 25. That is, since the core 23 is unsaturated prior to the time that the armature 30 is moved to an engaged position, its main coil 22 will have a high impedance across its terminals to thereby limit the inrush current flowing through the armature 30. That is, the saturable reactor 23 will protect the electromagnetic switch for a short time from the high inrush current $i_g$ and thus give it time to properly seat with respect to the stationary contacts 24—25.

At the time $T_5$, the saturable core 23 becomes saturated and hence, there will be a low impedance across the terminals of its main coil 22. Thus, at time $T_5$, the saturable reactor 23 will allow the current to rise to its full value.

The arc current $i_g$ which was flowing from electrode 33 to electrode 34 will drop to zero and the electromagnetic switch will remain closed.

When the line current again reduces toward zero, the same procedure above outlined will happen in the opposite direction.

It will be noted that several modifications of the circuit diagram of Figure 1 can be incorporated without departing from the spirit of the invention. For example, the resistor 16 may be eliminated by making the main windings 20—21 of high resistance wire to serve its function. Furthermore, the circuitry described may be used as a bypass system for very large voltages by connecting a plurality of such units in series.

In Figure 3, I have shown a second embodiment of my invention which utilizes the basic circuit of the first embodiment of Figure 1 but replaces arc gap device 33—34 by means of cold cathode tubes. In Figure 3, I have used identical notation numerals for the components which are common with the circuit of Figure 1.

In the second embodiment of my invention, the automatic bypass circuit is comprised of an electromagnetic switch with a commutating reactor and a trip circuit. The electromagnetic switch is similar in construction to that heretofore described in connection with Figure 1 and has fixed contacts 24 and 25 with an air gap therebetween which is bridged by a substantially massless armature 30.

The armature 30 is supported by the leaf spring 29 which, in turn, is mounted on the spacing insulators 27 and 28 and biases the armature 30 to disengaged position. The fixed contacts 24 and 25 are part of the magnetic pole structure 17—18. The movable contact—armature 30 is made of a soft magnetic material which is connected by a good conductor and forms the movable armature which will be moved into engagement with the stationary contacts 24 and 25 when these poles are sufficiently energized.

The series capacitor 11 is assumed to be connected in series between the source side 12 and the load side 13.

The bypass circuit exists through the main winding 20 of the magnetic structure 17, the winding 22 of the saturable reactor 23, the stationary contact 24, the movable contact or armature 30, the fixed contact 25 of the electromagnetic switch, the main winding 21 of the magnetic structure 18 back to the load side 13 of the power line.

Since the biasing spring 29 normally maintains the substantially massless armature in disengaged position, the circuit is normally open and can be closed by magnetizing the exciter magnet 17—18.

The insulator sheet 19 is positioned between the gaps of the magnetic structure 17 and 18 to provide electrical insulation although it permits the passage of magnetic flux in between.

When the voltage across the capacitor 11 exceeds a predetermined value, one of the cold cathode tubes 40—41 will break down depending on the polarity of the voltage.

The circuitry for the cold cathode tubes 40—41 is as follows.

Trip coils 42—43 are wound on the magnetic structure 17 and 18 and one end of each is respectively connected to one end of the main coils 20 and 21. The opposite end of the trip coils 42—43 are respectively connected through resistors 44 and 45 to taps 46 and 47 of the auto-transformer 48.

The cathode of cold cathode tube 40 and the plate of cold cathode tube 41 are also connected to tap 46 and the plate of cold cathode tube 40 of the cathode of tube 41 are also connected to the tap 47. A first grid of tubes 40 and 41 are respectively connected to taps 50 and 51 of the auto-transformer 48 and a second grid of tubes 40 and 41 are respectively connected to the end terminals 52—53 of the auto-transformer 52.

The second embodiment of Figure 3 has characteristics which are similar to those heretofore described in connection with the first embodiment of Figure 1. That is, the protective cycle has a duration of approximately one half cycle or shorter and is independent of conditions which existed prior to the operation of the automatic bypass circuit. Thus, the circuitry is capable of coping with unexpected surge voltages traveling waves or short circuits and will cease to operate the instant that the fault current condition subsides.

It will be assumed that the cold cathode tube 40 will break down when a positive excessive voltage exists across the terminals of the series capacitor 11. That is, when the voltage across the capacitor 11 rises to an unduly high value in the positive direction, the tube 40 will flash over or break down.

The cold cathode tube 40 is subjected to the voltage which exists across the capacitor 11 through the trip windings 42 and 43. The auto-transformer 52 merely serves to supply the necessary grid potential to the tubes in order to adjust the trip voltage to a predetermined desired value. When the tube 40 fires, the capacitor 11 will discharge itself through the trip coils 42 and 43 and the current will be limited due to the magnitude of the resistors 44 and 45. The discharge current flowing through the trip coils 42 and 43 will magnetize the excitor magnetic poles 17 and 18. This energization of the magnetic poles 17 and 18 will thereby attract the movable armature 30 to the engaged position to thereby provide a short circuit for the series capacitor 11 through the main windings 20 and 21 and the winding 22 of the saturable reactor 23.

The subsequent high discharge current now flowing through main windings 20 and 21 will hold the armature 30 in high pressure engagement due to the magnetic flux created by the energized windings 20–21.

When the main current decreases twoards zero, it will be maintained at a very low value, e. g., a hundred milli amps, for approximately 1/10,000 of a second, due to the high impedance of the main winding 22 of the commutating reactor 23. This time will be sufficiently long to permit the armature 30 to move from engaged to disengaged position without damaging the contacts. Furthermore, the current will not be able to rise in the opposite negative direction but instead will now charge the capacitor 11. However, if the voltage across the series capacitor 11 should rise above the critical value, that is, the predetermined maximum value, the same operation as above described will again be repeated except that the cold cathode tube 41 will not be initially fired to commence the operation.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claim.

I claim:

An automatic by-pass circuit for a series capacitor; said automatic by-pass circuit comprising the combination of an electromagnetic switch, a saturable reactor means and an arc discharge device; said electromagnetic switch comprising a pair of cooperable contacts and an operating winding means; said pair of cooperable contacts being normally disengaged, said operating winding means being positioned to move said pair of cooperable contacts to their disengaged position responsive to energization thereof by some current beyond a predetermined magnitude; said pair of cooperable contacts being connected in a first series connected circuit with said series capacitor, said saturable reactor means and said operating winding means; a second series connected circuit of at least said series capacitor, said arc discharge device, and said operating winding means; said arc discharge device and said pair of cooperable contacts being connected in parallel; said arc discharge device being constructed to conduct current responsive to the appearance of a voltage beyond some predetermined value on said series capacitor; the conduction of current in said second series circuit including said arc discharge device causing energization of said operating winding means to thereby close said cooperable contacts of said electromagnetic switch; said closed electromagnetic switch contacts forming said by-pass circuit for said series capacitor and for said arc discharge device whereby said arc discharge device is rendered non-conductive; said operating winding means in series with said cooperating contacts being de-energized when the current therethrough reaches a substantially zero value to open said by-pass circuit for said series capacitor for at least a portion of each cycle that said by-pass circuit is operable; said saturable reactor providing a relatively low current step for the opening and closing operation of said pair of cooperable contacts.

References Cited in the file of this patent

UNITED STATES PATENTS

| | | | |
|---|---|---|---|
| 1,973,538 | Moffett | Sept. 11, | 1934 |
| 2,207,577 | Buell | July 9, | 1940 |
| 2,284,876 | Marbury | June 2, | 1942 |
| 2,307,598 | Marbury | Jan. 5, | 1943 |
| 2,323,702 | Berkey | July 6, | 1943 |
| 2,345,590 | Evans et al. | Apr. 4, | 1944 |
| 2,363,898 | Partington | Nov. 28, | 1944 |
| 2,366,493 | Crary | Jan. 2, | 1945 |
| 2,569,133 | Podolsky | Sept. 25, | 1951 |
| 2,579,303 | Crary | Dec. 18, | 1951 |
| 2,610,231 | Wettstein | Sept. 9, | 1952 |
| 2,656,490 | Van Ryan | Oct. 20, | 1953 |
| 2,658,971 | Wettstein | Nov. 10, | 1953 |